US011463483B2

(12) United States Patent
Wadhwa et al.

(10) Patent No.: US 11,463,483 B2
(45) Date of Patent: Oct. 4, 2022

(54) SYSTEMS AND METHODS FOR DETERMINING EFFECTIVENESS OF NETWORK SEGMENTATION POLICIES

(71) Applicant: Cisco Technology, Inc., San Jose, CA (US)

(72) Inventors: Alok Lalit Wadhwa, Milpitas, CA (US); James Gabriel Fontenot, Allen, TX (US); Ashutosh Kulshreshtha, Cupertino, CA (US); Navindra Yadav, Cupertino, CA (US); Shashidhar Gandham, Fremont, CA (US); Weifei Zeng, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 102 days.

(21) Appl. No.: 16/921,184

(22) Filed: Jul. 6, 2020

(65) Prior Publication Data
US 2022/0006842 A1 Jan. 6, 2022

(51) Int. Cl.
*H04L 9/40* (2022.01)
*H04L 29/06* (2006.01)

(52) U.S. Cl.
CPC ................ *H04L 63/205* (2013.01)

(58) Field of Classification Search
CPC ....... H04L 63/205; H04L 63/20; H04L 63/10; H04L 63/107; H04L 63/108; H04L 63/1433
See application file for complete search history.

(56) References Cited

U.S. PATENT DOCUMENTS

| | | | |
|---|---|---|---|
| 9,727,733 B2 | 8/2017 | Choi et al. | |
| 9,819,565 B2 | 11/2017 | Djukie et al. | |
| 10,033,766 B2 | 7/2018 | Gupta et al. | |
| 10,122,276 B2 | 11/2018 | Chesla et al. | |
| 10,986,131 B1* | 4/2021 | Kruse | H04L 63/10 |
| 2004/0010709 A1* | 1/2004 | Baudoin | G06Q 40/08 |
| | | | 726/1 |
| 2005/0240670 A1* | 10/2005 | Cheng | G06Q 10/04 |
| | | | 709/227 |

(Continued)

OTHER PUBLICATIONS

International Search Report and Written Opinion from the International Searching Authority, dated Sep. 24, 2021, 12 pages, for corresponding International Patent Application No. PCT/US2021/038486.

(Continued)

*Primary Examiner* — Edward Zee
(74) *Attorney, Agent, or Firm* — Polsinelli

(57) ABSTRACT

Disclosed herein are methods, systems, and non-transitory computer-readable storage media for scoring network segmentation policies in order to determine their effectiveness before, during and after enforcement. In one aspect, a method includes identifying one or more applications within an enterprise network; identifying at least one network security policy in association with the one or more applications within the enterprise network; determining a score of the network security policy based on information corresponding to exposure of each of the one or more applications within the enterprise network; and executing the network security policy based on the score.

20 Claims, 8 Drawing Sheets

(56) References Cited

U.S. PATENT DOCUMENTS

2013/0055337 A1 2/2013 Choi et al.
2019/0319996 A1 10/2019 Levy et al.

OTHER PUBLICATIONS

Abedin, Muhammad, et al., "Vulnerability Analysis for Evaluating Quality of Protection of Security Policies," Oct. 30, 2006, pp. 49-51.
Ahmed, Mohammad Salim, et al., "A Novel Quantitative Approach for Measuring Network Security," INFOCOM 2008, The $27^{th}$ Conference on Computer Communications, IEEE, Apr. 13, 2008, pp. 76-80.
Han, Yi, et al., "Security Policy Pre-evaluation towards Risk Analysis," 2008 International Conference on Information Security and Assurance, Apr. 24, 2008, pp. 415-420.

\* cited by examiner

```
"default_policies": [
    {
        "consumer_filter_id": "5da72403497d4f17655b3386",
        "provider_filter_id": "5d7aa66b755f020b49c05bcf",
        "consumer_filter_name": "web",
        "provider_filter_name": "Default:common",
        "l4_params": [
            {
                "port": [
                    443,
                    443
                ],                    ◄——— Provided Services
                "proto": 6,
                "confidence": 0.95,
                "approved": false
            }
        ],
        "action": "ALLOW",
        "priority": 100,
        "__internal_src_risk_exposure": 2.0,  ◄——— # Policy Consumers
        "__internal_dst_risk_exposure": 17.0, ◄
        "__internal_security_posture": 34.0
    }
]                                             ◄——— # Policy Providers
```

FIG. 6

| Application Name | Potential SRC Risk | SRC Risk | Consumers | Effectiveness |
|---|---|---|---|---|
| Common (5da722b3497d4f7f1448e640) | 580 | 411 | 3 | 0.291379 |
| RCDN-IT (5da7236749d4f16854 8e741) | 435 | 117 | 1 | 0.731034 |
| SJC-HR (5da722a5497d4f485448d406) | 580 | 117 | 1 | 0.798276 |

FIG. 7

SYSTEMS AND METHODS FOR DETERMINING EFFECTIVENESS OF NETWORK SEGMENTATION POLICIES

TECHNICAL FIELD

The subject matter of this disclosure relates in general to the field of computer networks, and more specifically to determining effectiveness of network policies before, during and after implementation of the network policies in the network.

BACKGROUND

With expansion of enterprise networks and their applicability, various network security policies may be applied to network nodes and workloads to ensure safety and security of the entire enterprise network. For example, network operators must develop and enforce network segmentation policies which govern who can access any given service or workload, which devices can access specific services, etc.

However, there is not objective and standard approach for measuring/predicting effectiveness of such network segmentation policies on application performance within the network.

BRIEF DESCRIPTION OF THE FIGURES

In order to describe the manner in which the above-recited and other advantages and features of the disclosure can be obtained, a more particular description of the principles briefly described above will be rendered by reference to specific embodiments that are illustrated in the appended drawings. Understanding that these drawings depict only embodiments of the disclosure and are not therefore to be considered to be limiting of its scope, the principles herein are described and explained with additional specificity and detail through the use of the accompanying drawings in which:

FIG. 6 is an example network segmentation policy, according to an aspect of the present disclosure;

FIG. 7 illustrates a result of determining policy effectiveness score in a tabular form, according to one aspect of the present disclosure.

DESCRIPTION OF EXAMPLE EMBODIMENTS

Figure 1:
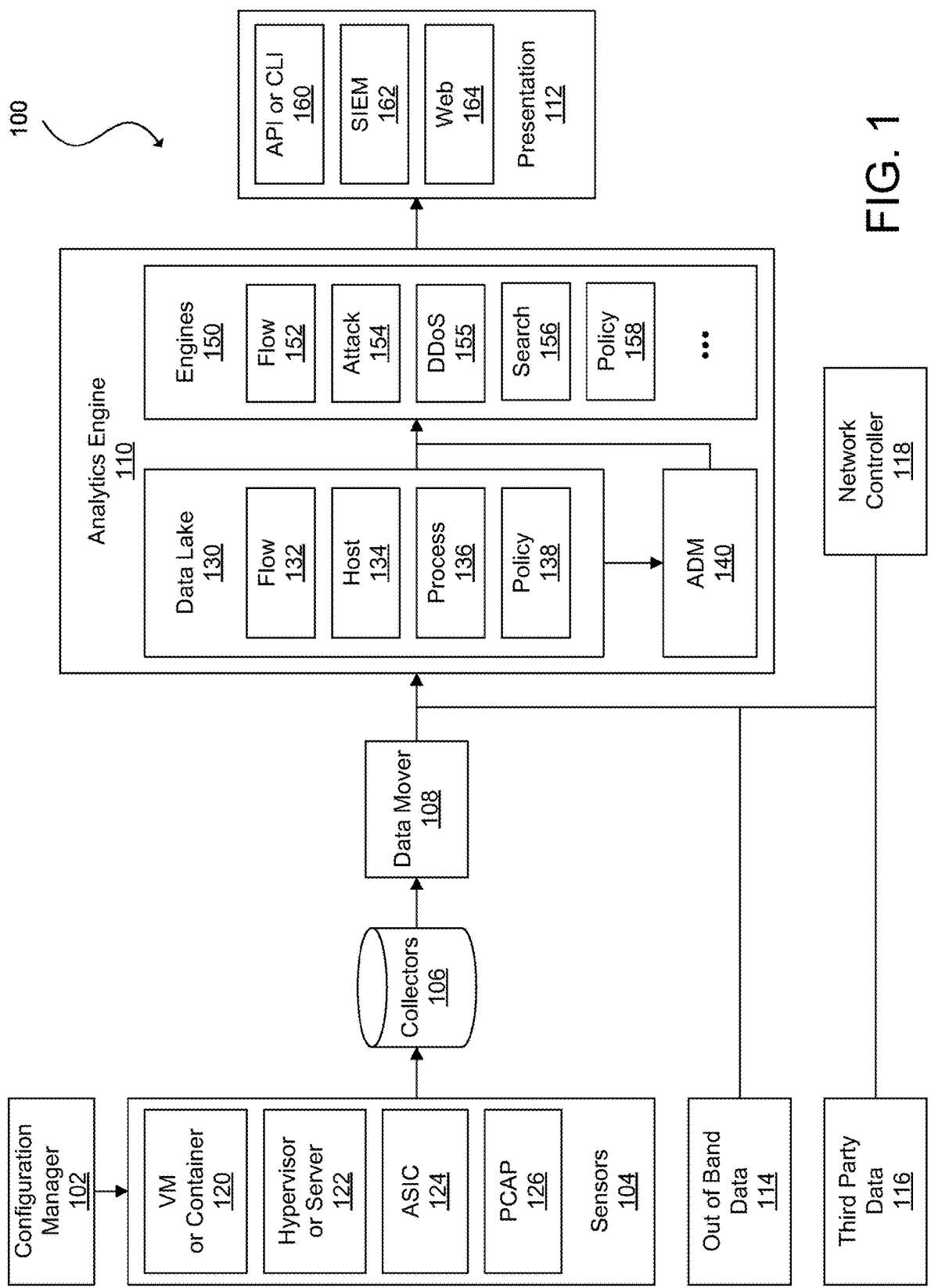
FIG. 1 illustrates an example of a network traffic monitoring system, according to one aspect of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Disclosed herein are methods, systems, and non-transitory computer-readable storage media for scoring network segmentation policies in order to determine their effectiveness before, during and after enforcement. Such scoring system provides an objective measurement of how effective any given network segmentation/security policy is. The measurement can then be used to modify/adjust segmentation and security policies in the network In one aspect, a method includes identifying one or more applications within an enterprise network; identifying at least one network security policy in association with the one or more applications within the enterprise network; determining a score of the network security policy based on information corresponding to exposure of each of the one or more applications within the enterprise network; and executing the network security policy based on the score.

In another aspect, the method further includes receiving a request for determining network security policy scores.

In another aspect, identifying the one or more applications includes determining an application hierarchy and membership for each of the one or more applications in the network.

In another aspect, identifying the network security policy includes performing an application dependency mapping for the one or more applications.

In another aspect, determining the score for the network security policy includes identifying the information corresponding to the exposure of the one or more applications.

In another aspect, the information includes providers, consumers and services associated with each of the one or more applications.

In another aspect, executing the network security policy includes one of modifying, replacing or maintaining a current version of the network security policy.

In one aspect, a system includes one or more processors and a non-transitory computer-readable storage medium including instructions stored thereon which, when executed by the one or more processors, cause the one or more processors to identify one or more applications within an enterprise network; identify at least one network security policy in association with the one or more applications within the enterprise network; determine a score of the network security policy based on information corresponding to exposure of each of the one or more applications within the enterprise network; and execute the network security policy based on the score.

In one aspect, a non-transitory computer-readable storage medium has stored thereon instructions which, when executed by at least one processor, cause the at least one processor to identify one or more applications within an enterprise network; identify at least one network security policy in association with the one or more applications within the enterprise network; determine a score of the network security policy based on information corresponding to exposure of each of the one or more applications within the enterprise network; and execute the network security policy based on the score.

Description

Various embodiments of the disclosure are discussed in detail below. While specific implementations are discussed, it should be understood that this is done for illustrative purposes only. A person skilled in the relevant art will recognize that other components and configurations may be used without departing from the spirit and scope of the disclosure.

As noted above, there is currently no objective and standardized approach and system for measuring/predicting effectiveness of network segmentation and security policies. The present disclosure is directed to providing such scoring system measuring the effectiveness of a derived or enforced network segmentation policy. Segmentation effectiveness may be defined as a measure of effectiveness of a particular policy given the exposure of an application to hosts within the infrastructure of an enterprise network and/or to resources external to the enterprise network but accessible via the enterprise network (e.g., external internet hosts). Such measurement may be indicative of how well a given policy is satisfying the determined objective of preventing unauthorized traffic or hosts from accessing an application or a set of services/workloads executed in association with an application. This objective measurement improves efficiency in ensuring network security by allowing policies to be measured before implementation and adjusted if need be and/or to reliably adjust existing and currently implemented network segmentation policies in the network.

As will be described below, effectiveness score may be determined based on a number of variables such as source exposure risk, destination exposure risk and security posture. A source exposure risk may be indicative of a total number of hosts and workloads accessing a given application. A destination exposure risk may be indicative of a total number of hosts and workloads providing services for a given application. Security posture may be factor of overall consumers and providers that form/constitute a given application.

The disclosure begins with an initial discussion of systems and technologies for monitoring network activity. A description of example systems, methods, and environments for this monitoring technology will be discussed in FIGS. 1 through 3. The discussion will then continue with methods, systems, and non-transitory computer-readable media for determining effectiveness of network security and segmentation policies with reference to FIGS. 4-7. The disclosure concludes with a description of an example computing system, described in FIG. 8, which can be utilized as components of systems and environments described with reference to FIGS. 1-7.

The disclosure now turns to an initial discussion of example systems and technologies for monitoring network activity.

Sensors deployed in a network can be used to gather network information related to network traffic of nodes operating in the network and process information for nodes and applications running in the network. Gathered network information can be analyzed to provide insights into the operation of the nodes in the network, otherwise referred to as analytics/telemetry data. In particular, discovered applications or inventories, application dependencies, policies, efficiencies, resource and bandwidth usage, and network flows can be determined for the network using the network traffic data. For example, an analytics engine can be configured to automate discovery of applications running in the network, map the applications' interdependencies, or generate a set of proposed network policies for implementation.

The analytics engine can monitor network information, process information, and other relevant information of traffic passing through the network using a sensor network that provides multiple perspectives for the traffic. The sensor network can include sensors for networking devices (e.g., routers, switches, network appliances), physical servers, hypervisors or shared kernels, and virtual partitions (e.g., VMs or containers), and other network elements. The analytics engine can analyze the network information, process information, and other pertinent information to determine various network insights.

Referring now to the drawings, FIG. 1 illustrates an example of a network traffic monitoring system, according to one aspect of the present disclosure. The network traffic monitoring system 100 can include a configuration manager 102, sensors 104, a collector module 106, a data mover module 108, an analytics engine 110, and a presentation module 112. In FIG. 1, the analytics engine 110 is also shown in communication with out-of-band data sources 114, third party data sources 116, and a network controller 118.

The configuration manager 102 can be used to provision and maintain the sensors 104, including installing sensor software or firmware in various nodes of a network, configuring the sensors 104, updating the sensor software or firmware, among other sensor management tasks. For example, the sensors 104 can be implemented as virtual partition images (e.g., virtual machine (VM) images or container images), and the configuration manager 102 can distribute the images to host machines. In general, a virtual partition may be an instance of a VM, container, sandbox, or other isolated software environment. The software environment may include an operating system and application software. For software running within a virtual partition, the virtual partition may appear to be, for example, one of many servers or one of many operating systems executed on a single physical server. The configuration manager 102 can instantiate a new virtual partition or migrate an existing partition to a different physical server. The configuration manager 102 can also be used to configure the new or migrated sensor.

The configuration manager 102 can monitor the health of the sensors 104. For example, the configuration manager 102 may request status updates and/or receive heartbeat messages, initiate performance tests, generate health checks, and perform other health monitoring tasks. In some embodiments, the configuration manager 102 can also authenticate the sensors 104. For instance, the sensors 104 can be assigned a unique identifier, such as by using a one-way hash function of a sensor's basic input/out system (BIOS) universally unique identifier (UUID) and a secret key stored by the configuration image manager 102. The UUID can be a large number that may be difficult for a malicious sensor or other device or component to guess. In some embodiments, the configuration manager 102 can keep the sensors 104 up to date by installing the latest versions of sensor software and/or applying patches. The configuration manager 102 can obtain these updates automatically from a local source or the Internet.

The sensors 104 can reside on various nodes of a network, such as a virtual partition (e.g., VM or container) 120; a hypervisor or shared kernel managing one or more virtual partitions and/or physical servers 122, an application-specific integrated circuit (ASIC) 124 of a switch, router, gateway, or other networking device, or a packet capture (pcap) 126 appliance (e.g., a standalone packet monitor, a device connected to a network devices monitoring port, a device connected in series along a main trunk of a datacenter, or similar device), or other element of a network. The sensors 104 can monitor network traffic between nodes, and send network traffic data and corresponding data (e.g., host data, process data, user data, etc.) to the collectors 106 for storage. For example, the sensors 104 can sniff packets being sent over its hosts' physical or virtual network interface card (NIC), or individual processes can be configured to report network traffic and corresponding data to the sensors 104. Incorporating the sensors 104 on multiple nodes and within multiple partitions of some nodes of the network can provide for robust capture of network traffic and corresponding data from each hop of data transmission. In some embodiments, each node of the network (e.g., VM, container, or other virtual partition 120, hypervisor, shared kernel, or physical server 122, ASIC 124, pcap 126, etc.) includes a respective sensor 104. However, it should be understood that various software and hardware configurations can be used to implement the sensor network 104.

As the sensors 104 capture communications and corresponding data, they may continuously send network traffic data to the collectors 106. The network traffic data can include metadata relating to a packet, a collection of packets, a flow, a bidirectional flow, a group of flows, a session, or a network communication of another granularity. That is, the network traffic data can generally include any information describing communication on all layers of the Open Systems Interconnection (OSI) model. For example, the network traffic data can include source/destination MAC address, source/destination IP address, protocol, port number, etc. In some embodiments, the network traffic data can also include summaries of network activity or other network statistics such as number of packets, number of bytes, number of flows, bandwidth usage, response time, latency, packet loss, jitter, and other network statistics.

The sensors 104 can also determine additional data for each session, bidirectional flow, flow, packet, or other more granular or less granular network communication. The additional data can include host and/or endpoint information, virtual partition information, sensor information, process information, user information, tenant information, application information, network topology, application dependency mapping, cluster information, or other information corresponding to each flow.

In some embodiments, the sensors 104 can perform some preprocessing of the network traffic and corresponding data before sending the data to the collectors 106. For example, the sensors 104 can remove extraneous or duplicative data or they can create summaries of the data (e.g., latency, number of packets per flow, number of bytes per flow, number of flows, etc.). In some embodiments, the sensors 104 can be configured to only capture certain types of network information and disregard the rest. In some embodiments, the sensors 104 can be configured to capture only a representative sample of packets (e.g., every 1,000th packet or other suitable sample rate) and corresponding data.

Since the sensors 104 may be located throughout the network, network traffic and corresponding data can be collected from multiple vantage points or multiple perspectives in the network to provide a more comprehensive view of network behavior. The capture of network traffic and corresponding data from multiple perspectives rather than just at a single sensor located in the data path or in communication with a component in the data path, allows the data to be correlated from the various data sources, which may be used as additional data points by the analytics engine 110. Further, collecting network traffic and corresponding data from multiple points of view ensures more accurate data is captured. For example, other types of sensor networks may be limited to sensors running on external-facing network devices (e.g., routers, switches, network appliances, etc.) such that east-west traffic, including VM-to-VM or container-to-container traffic on a same host, may not be monitored. In addition, packets that are dropped before traversing a network device or packets containing errors may not be accurately monitored by other types of sensor networks. The sensor network 104 of various embodiments substantially mitigates or eliminates these issues altogether by locating sensors at multiple points of potential failure. Moreover, the network traffic monitoring system 100 can verify multiple instances of data for a flow (e.g., source endpoint flow data, network device flow data, and endpoint flow data) against one another.

In some embodiments, the network traffic monitoring system 100 can assess a degree of accuracy of flow data sets from multiple sensors and utilize a flow data set from a single sensor determined to be the most accurate and/or complete. The degree of accuracy can be based on factors such as network topology (e.g., a sensor closer to the source may be more likely to be more accurate than a sensor closer to the destination), a state of a sensor or a node hosting the sensor (e.g., a compromised sensor/node may have less accurate flow data than an uncompromised sensor/node), or flow data volume (e.g., a sensor capturing a greater number of packets for a flow may be more accurate than a sensor capturing a smaller number of packets).

In some embodiments, the network traffic monitoring system 100 can assemble the most accurate flow data set and corresponding data from multiple sensors. For instance, a first sensor along a data path may capture data for a first packet of a flow but may be missing data for a second packet of the flow while the situation is reversed for a second sensor along the data path. The network traffic monitoring system 100 can assemble data for the flow from the first packet captured by the first sensor and the second packet captured by the second sensor.

As discussed, the sensors 104 can send network traffic and corresponding data to the collectors 106. In some embodiments, each sensor can be assigned to a primary collector and a secondary collector as part of a high availability scheme. If the primary collector fails or communications between the sensor and the primary collector are not otherwise possible, a sensor can send its network traffic and corresponding data to the secondary collector. In other embodiments, the sensors 104 are not assigned specific collectors but the network traffic monitoring system 100 can determine an optimal collector for receiving the network traffic and corresponding data through a discovery process. In such embodiments, a sensor can change where it sends it network traffic and corresponding data if its environments changes, such as if a default collector fails or if the sensor is migrated to a new location and it would be optimal for the sensor to send its data to a different collector. For example, it may be preferable for the sensor to send its network traffic and corresponding data on a particular path and/or to a particular collector based on latency, shortest path, monetary cost (e.g., using private resources versus a public resources provided by a public cloud provider), error rate, or some combination of these factors. In other embodiments, a sensor can send different types of network traffic and corresponding data to different collectors. For example, the sensor can send first network traffic and corresponding data related to one type of process to one collector and second network traffic and corresponding data related to another type of process to another collector.

The collectors 106 can be any type of storage medium that can serve as a repository for the network traffic and corresponding data captured by the sensors 104. In some embodiments, data storage for the collectors 106 is located in an in-memory database, such as dashDB from IBM®, although it should be appreciated that the data storage for the collectors 106 can be any software and/or hardware capable of providing rapid random access speeds typically used for analytics software. In various embodiments, the collectors 106 can utilize solid state drives, disk drives, magnetic tape drives, or a combination of the foregoing according to cost, responsiveness, and size requirements. Further, the collectors 106 can utilize various database structures such as a normalized relational database or a NoSQL database, among others.

In some embodiments, the collectors 106 may only serve as network storage for the network traffic monitoring system 100. In such embodiments, the network traffic monitoring system 100 can include a data mover module 108 for retrieving data from the collectors 106 and making the data available to network clients, such as the components of the analytics engine 110. In effect, the data mover module 108 can serve as a gateway for presenting network-attached storage to the network clients. In other embodiments, the collectors 106 can perform additional functions, such as organizing, summarizing, and preprocessing data. For example, the collectors 106 can tabulate how often packets of certain sizes or types are transmitted from different nodes of the network. The collectors 106 can also characterize the traffic flows going to and from various nodes. In some embodiments, the collectors 106 can match packets based on sequence numbers, thus identifying traffic flows and connection links. As it may be inefficient to retain all data indefinitely in certain circumstances, in some embodiments, the collectors 106 can periodically replace detailed network traffic data with consolidated summaries. In this manner, the collectors 106 can retain a complete dataset describing one period (e.g., the past minute or other suitable period of time), with a smaller dataset of another period (e.g., the previous 2-10 minutes or other suitable period of time), and progressively consolidate network traffic and corresponding data of other periods of time (e.g., day, week, month, year, etc.). In some embodiments, network traffic and corresponding data for a set of flows identified as normal or routine can be winnowed at an earlier period of time while a more complete data set may be retained for a lengthier period of time for another set of flows identified as anomalous or as an attack.

Computer networks may be exposed to a variety of different attacks that expose vulnerabilities of computer systems in order to compromise their security. Some network traffic may be associated with malicious programs or devices. The analytics engine 110 may be provided with examples of network states corresponding to an attack and network states corresponding to normal operation. The analytics engine 110 can then analyze network traffic and corresponding data to recognize when the network is under attack. In some embodiments, the network may operate within a trusted environment for a period of time so that the analytics engine 110 can establish a baseline of normal operation. Since malware is constantly evolving and changing, machine learning may be used to dynamically update models for identifying malicious traffic patterns.

In some embodiments, the analytics engine 110 may be used to identify observations which differ from other examples in a dataset. For example, if a training set of example data with known outlier labels exists, supervised anomaly detection techniques may be used. Supervised anomaly detection techniques utilize data sets that have been labeled as normal and abnormal and train a classifier. In a case in which it is unknown whether examples in the training data are outliers, unsupervised anomaly techniques may be used. Unsupervised anomaly detection techniques may be used to detect anomalies in an unlabeled test data set under the assumption that the majority of instances in the data set are normal by looking for instances that seem to fit to the remainder of the data set.

The analytics engine 110 can include a data lake 130, an application dependency mapping (ADM) module 140, and elastic processing engines 150. The data lake 130 is a large-scale storage repository that provides massive storage for various types of data, enormous processing power, and the ability to handle nearly limitless concurrent tasks or jobs.

In some embodiments, the data lake 130 is implemented using the Hadoop® Distributed File System (HDFS™) from Apache® Software Foundation of Forest Hill, Md. HDFS™ is a highly scalable and distributed file system that can scale to thousands of cluster nodes, millions of files, and petabytes of data. HDFS™ is optimized for batch processing where data locations are exposed to allow computations to take place where the data resides. HDFS™ provides a single namespace for an entire cluster to allow for data coherency in a write-once, read-many access model. That is, clients can only append to existing files in the node. In HDFS™, files are separated into blocks, which are typically 64 MB in size and are replicated in multiple data nodes. Clients access data directly from data nodes.

In some embodiments, the data mover 108 receives raw network traffic and corresponding data from the collectors 106 and distributes or pushes the data to the data lake 130. The data lake 130 can also receive and store out-of-band data 114, such as statuses on power levels, network availability, server performance, temperature conditions, cage door positions, and other data from internal sources, and third party data 116, such as security reports (e.g., provided by Cisco® Systems, Inc. of San Jose, Calif., Arbor Networks® of Burlington, Mass., Symantec® Corp. of Sunnyvale, Calif., Sophos® Group plc of Abingdon, England, Microsoft® Corp. of Seattle, Wash., Verizon® Communications, Inc. of New York, N.Y., among others), geolocation data, IP watch lists, Whois data, configuration management database (CMDB) or configuration management system (CMS) as a service, and other data from external sources. In other embodiments, the data lake 130 may instead fetch or pull raw traffic and corresponding data from the collectors 106 and relevant data from the out-of-band data sources 114 and the third party data sources 116. In yet other embodiments, the functionality of the collectors 106, the data mover 108, the out-of-band data sources 114, the third party data sources 116, and the data lake 130 can be combined. Various combinations and configurations are possible as would be known to one of ordinary skill in the art.

Each component of the data lake 130 can perform certain processing of the raw network traffic data and/or other data (e.g., host data, process data, user data, out-of-band data or third party data) to transform the raw data to a form useable by the elastic processing engines 150. In some embodiments, the data lake 130 can include repositories for flow attributes 132, host and/or endpoint attributes 134, process attributes 136, and policy attributes 138. In some embodiments, the data lake 130 can also include repositories for VM or container attributes, application attributes, tenant attributes, network topology, application dependency maps, cluster attributes, etc.

The flow attributes 132 relate to information about flows traversing the network. A flow is generally one or more packets sharing certain attributes that are sent within a network within a specified period of time. The flow attributes 132 can include packet header fields such as a source address (e.g., Internet Protocol (IP) address, Media Access Control (MAC) address, Domain Name System (DNS) name, or other network address), source port, destination address, destination port, protocol type, class of service, among other fields. The source address may correspond to a first endpoint (e.g., network device, physical server, virtual partition, etc.) of the network, and the destination address may correspond to a second endpoint, a multicast group, or a broadcast domain. The flow attributes 132 can also include aggregate packet data such as flow start time, flow end time, number of packets for a flow, number of bytes for a flow, the union of TCP flags for a flow, among other flow data.

The host and/or endpoint attributes 134 describe host and/or endpoint data for each flow, and can include host and/or endpoint name, network address, operating system, CPU usage, network usage, disk space, ports, logged users, scheduled jobs, open files, and information regarding files and/or directories stored on a host and/or endpoint (e.g., presence, absence, or modifications of log files, configuration files, device special files, or protected electronic information). As discussed, in some embodiments, the host and/or endpoints attributes 134 can also include the out-of-band data 114 regarding hosts such as power level, temperature, and physical location (e.g., room, row, rack, cage door position, etc.) or the third party data 116 such as whether a host and/or endpoint is on an IP watch list or otherwise associated with a security threat, Whois data, or geocoordinates. In some embodiments, the out-of-band data 114 and the third party data 116 may be associated by process, user, flow, or other more granular or less granular network element or network communication.

The process attributes 136 relate to process data corresponding to each flow, and can include process name (e.g., bash, httpd, netstat, etc.), ID, parent process ID, path (e.g., /usr2/username/bin/, /usr/local/bin, /usr/bin, etc.), CPU utilization, memory utilization, memory address, scheduling information, nice value, flags, priority, status, start time, terminal type, CPU time taken by the process, the command that started the process, and information regarding a process owner (e.g., user name, ID, user's real name, e-mail address, user's groups, terminal information, login time, expiration date of login, idle time, and information regarding files and/or directories of the user).

The policy attributes 138 contain information relating to network policies. Policies establish whether a particular flow is allowed or denied by the network as well as a specific route by which a packet traverses the network. Policies can also be used to mark packets so that certain kinds of traffic receive differentiated service when used in combination with queuing techniques such as those based on priority, fairness, weighted fairness, token bucket, random early detection, round robin, among others. The policy attributes 138 can include policy statistics such as a number of times a policy was enforced or a number of times a policy was not enforced. The policy attributes 138 can also include associations with network traffic data. For example, flows found to be non-conformant can be linked or tagged with corresponding policies to assist in the investigation of non-conformance.

The analytics engine 110 may include any number of engines 150, including for example, a flow engine 152 for identifying flows (e.g., flow engine 152) or an attacks engine 154 for identify attacks to the network. In some embodiments, the analytics engine can include a separate distributed denial of service (DDoS) attack engine 155 for specifically detecting DDoS attacks. In other embodiments, a DDoS attack engine may be a component or a sub-engine of a general attacks engine. In some embodiments, the attacks engine 154 and/or the DDoS engine 155 can use machine learning techniques to identify security threats to a network. For example, the attacks engine 154 and/or the DDoS engine 155 can be provided with examples of network states corresponding to an attack and network states corresponding to normal operation. The attacks engine 154 and/or the DDoS engine 155 can then analyze network traffic data to recognize when the network is under attack. In some embodiments, the network can operate within a trusted environment for a time to establish a baseline for normal network operation for the attacks engine 154 and/or the DDoS.

The analytics engine 110 may further include a search engine 156. The search engine 156 may be configured, for example to perform a structured search, an NLP (Natural Language Processing) search, or a visual search. Data may be provided to the engines from one or more processing components.

The analytics engine 110 can also include a policy engine 158 that manages network policy, including creating and/or importing policies, monitoring policy conformance and non-conformance, enforcing policy, simulating changes to policy or network elements affecting policy, among other policy-related tasks.

The ADM module 140 can determine dependencies of applications of the network. That is, particular patterns of traffic may correspond to an application, and the interconnectivity or dependencies of the application can be mapped to generate a graph for the application (i.e., an application dependency mapping). In this context, an application refers to a set of networking components that provides connectivity for a given set of workloads. For example, in a three-tier architecture for a web application, first endpoints of the web tier, second endpoints of the application tier, and third endpoints of the data tier make up the web application. The ADM module 140 can receive input data from various repositories of the data lake 130 (e.g., the flow attributes 132, the host and/or endpoint attributes 134, the process attributes 136, etc.). The ADM module 140 may analyze the input data to determine that there is first traffic flowing between external endpoints on port 80 of the first endpoints corresponding to Hypertext Transfer Protocol (HTTP) requests and responses. The input data may also indicate second traffic between first ports of the first endpoints and second ports of the second endpoints corresponding to application server requests and responses and third traffic flowing between third ports of the second endpoints and fourth ports of the third endpoints corresponding to database requests and responses. The ADM module 140 may define an ADM for the web application as a three-tier application including a first EPG comprising the first endpoints, a second EPG comprising the second endpoints, and a third EPG comprising the third endpoints.

The presentation module 112 can include an application programming interface (API) or command line interface (CLI) 160, a security information and event management (SIEM) interface 162, and a web front-end 164. As the analytics engine 110 processes network traffic and corresponding data and generates analytics data, the analytics data may not be in a human-readable form or it may be too voluminous for a user to navigate. The presentation module 112 can take the analytics data generated by analytics engine 110 and further summarize, filter, and organize the analytics data as well as create intuitive presentations for the analytics data.

In some embodiments, the API or CLI 160 can be implemented using Hadoop® Hive from Apache® for the back end, and Java® Database Connectivity (JDBC) from Oracle® Corporation of Redwood Shores, Calif., as an API layer. Hive is a data warehouse infrastructure that provides data summarization and ad hoc querying. Hive provides a mechanism to query data using a variation of structured query language (SQL) that is called HiveQL. JDBC is an application programming interface (API) for the programming language Java®, which defines how a client may access a database.

In some embodiments, the SIEM interface 162 can be implemented using Kafka for the back end, and software provided by Splunk®, Inc. of San Francisco, Calif. as the SIEM platform. Kafka is a distributed messaging system that is partitioned and replicated. Kafka uses the concept of topics. Topics are feeds of messages in specific categories. In some embodiments, Kafka can take raw packet captures and telemetry information from the data mover 108 as input, and output messages to a SIEM platform, such as Splunk®. The Splunk® platform is utilized for searching, monitoring, and analyzing machine-generated data.

In some embodiments, the web front-end 164 can be implemented using software provided by MongoDB®, Inc. of New York, N.Y. and Hadoop® ElasticSearch from Apache® for the back-end, and Ruby on Rails™ as the web application framework. MongoDB® is a document-oriented NoSQL database based on documents in the form of JavaScript® Object Notation (JSON) with dynamic schemas. ElasticSearch is a scalable and real-time search and analytics engine that provides domain-specific language (DSL) full querying based on JSON. Ruby on Rails™ is model-view-controller (MVC) framework that provides default structures for a database, a web service, and web pages. Ruby on Rails™ relies on web standards such as JSON or extensible markup language (XML) for data transfer, and hypertext markup language (HTML), cascading style sheets, (CSS), and JavaScript® for display and user interfacing.

Although FIG. 1 illustrates an example configuration of the various components of a network traffic monitoring system, those of skill in the art will understand that the components of the network traffic monitoring system 100 or any system described herein can be configured in a number of different ways and can include any other type and number of components. For example, the sensors 104, the collectors 106, the data mover 108, and the data lake 130 can belong to one hardware and/or software module or multiple separate modules. Other modules can also be combined into fewer components and/or further divided into more components.

Figure 2:
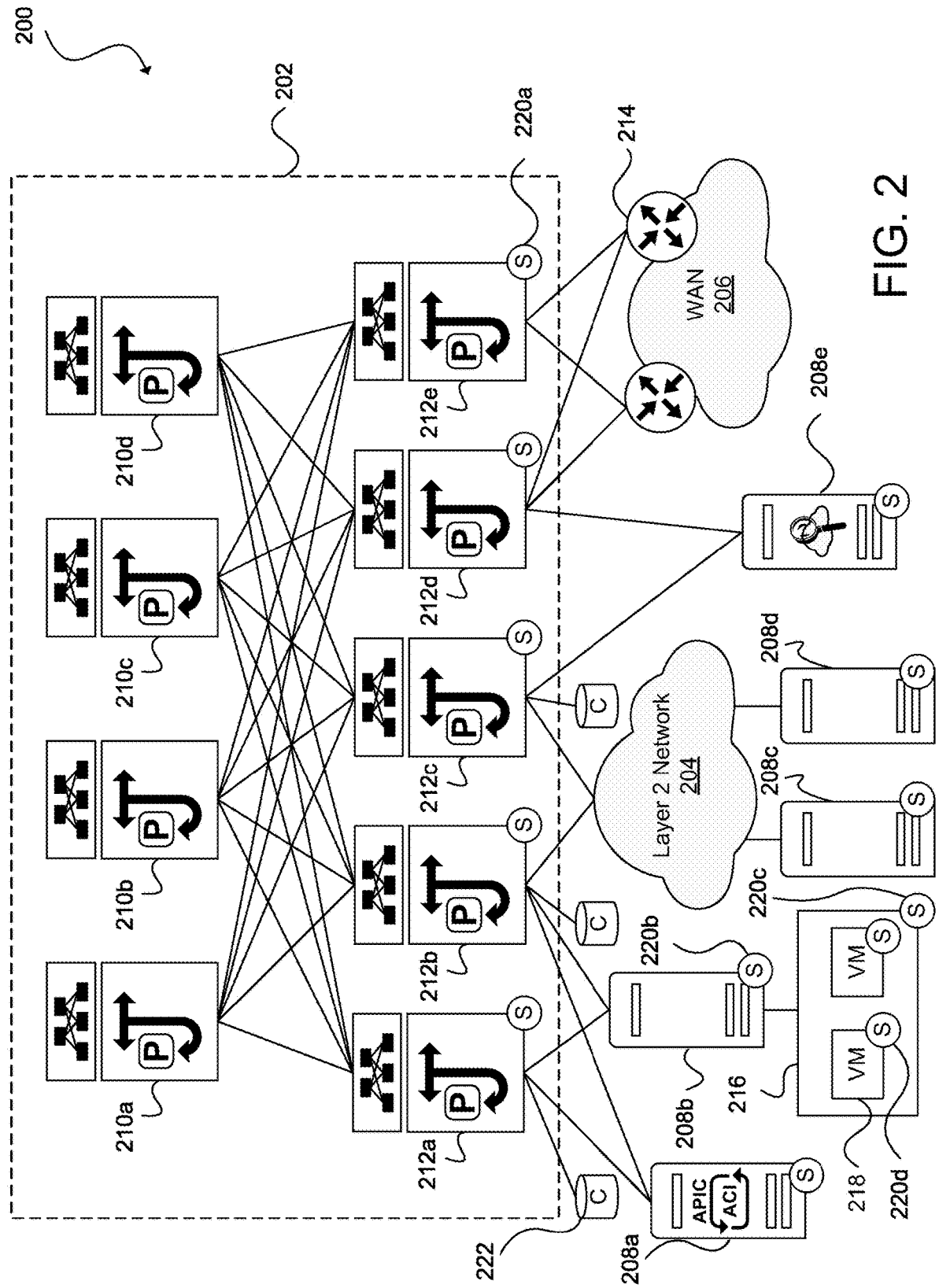
FIG. 2 illustrates an example of a network environment, according to one aspect of the present disclosure.

FIG. 2 illustrates an example of a network environment, according to one aspect of the present disclosure. In some embodiments, a network traffic monitoring system, such as the network traffic monitoring system 100 of FIG. 1, can be implemented in the network environment 200. It should be understood that, for the network environment 200 and any environment discussed herein, there can be additional or fewer nodes, devices, links, networks, or components in similar or alternative configurations. Embodiments with different numbers and/or types of clients, networks, nodes, cloud components, servers, software components, devices, virtual or physical resources, configurations, topologies, services, appliances, deployments, or network devices are also contemplated herein. Further, the network environment 200 can include any number or type of resources, which can be accessed and utilized by clients or tenants. The illustrations and examples provided herein are for clarity and simplicity.

The network environment 200 can include a network fabric 202, a Layer 2 (L2) network 204, a Layer 3 (L3) network 206, and servers 208a, 208b, 208c, 208d, and 208e (collectively, 208). The network fabric 202 can include spine switches 210a, 210b, 210c, and 210d (collectively, "210") and leaf switches 212a, 212b, 212c, 212d, and 212e (collectively, "212"). The spine switches 210 can connect to the leaf switches 212 in the network fabric 202. The leaf switches 212 can include access ports (or non-fabric ports) and fabric ports. The fabric ports can provide uplinks to the spine switches 210, while the access ports can provide connectivity to endpoints (e.g., the servers 208), internal networks (e.g., the L2 network 204), or external networks (e.g., the L3 network 206).

The leaf switches 212 can reside at the edge of the network fabric 202, and can thus represent the physical network edge. For instance, in some embodiments, the leaf switches 212d and 212e operate as border leaf switches in communication with edge devices 214 located in the external network 206. The border leaf switches 212d and 212e may be used to connect any type of external network device, service (e.g., firewall, deep packet inspector, traffic monitor, load balancer, etc.), or network (e.g., the L3 network 206) to the fabric 202.

Although the network fabric 202 is illustrated and described herein as an example leaf-spine architecture, one of ordinary skill in the art will readily recognize that various embodiments can be implemented based on any network topology, including any data center or cloud network fabric. Indeed, other architectures, designs, infrastructures, and variations are contemplated herein. For example, the principles disclosed herein are applicable to topologies including three-tier (including core, aggregation, and access levels), fat tree, mesh, bus, hub and spoke, etc. Thus, in some embodiments, the leaf switches 212 can be top-of-rack switches configured according to a top-of-rack architecture. In other embodiments, the leaf switches 212 can be aggregation switches in any particular topology, such as end-of-row or middle-of-row topologies. In some embodiments, the leaf switches 212 can also be implemented using aggregation switches.

Moreover, the topology illustrated in FIG. 2 and described herein is readily scalable and may accommodate a large number of components, as well as more complicated arrangements and configurations. For example, the network may include any number of fabrics 202, which may be geographically dispersed or located in the same geographic area. Thus, network nodes may be used in any suitable network topology, which may include any number of servers, virtual machines or containers, switches, routers, appliances, controllers, gateways, or other nodes interconnected to form a large and complex network. Nodes may be coupled to other nodes or networks through one or more interfaces employing any suitable wired or wireless connection, which provides a viable pathway for electronic communications.

Network communications in the network fabric 202 can flow through the leaf switches 212. In some embodiments, the leaf switches 212 can provide endpoints (e.g., the servers 208), internal networks (e.g., the L2 network 204), or external networks (e.g., the L3 network 206) access to the network fabric 202, and can connect the leaf switches 212 to each other. In some embodiments, the leaf switches 212 can connect endpoint groups (EPGs) to the network fabric 202, internal networks (e.g., the L2 network 204), and/or any external networks (e.g., the L3 network 206). EPGs are groupings of applications, or application components, and tiers for implementing forwarding and policy logic. EPGs can allow for separation of network policy, security, and forwarding from addressing by using logical application boundaries. EPGs can be used in the network environment 200 for mapping applications in the network. For example, EPGs can comprise a grouping of endpoints in the network indicating connectivity and policy for applications.

As discussed, the servers 208 can connect to the network fabric 202 via the leaf switches 212. For example, the servers 208a and 208b can connect directly to the leaf switches 212a and 212b, which can connect the servers 208a and 208b to the network fabric 202 and/or any of the other leaf switches. The servers 208c and 208d can connect to the leaf switches 212b and 212c via the L2 network 204. The servers 208c and 208d and the L2 network 204 make up a local area network (LAN). LANs can connect nodes over dedicated private communications links located in the same general physical location, such as a building or campus.

The WAN 206 can connect to the leaf switches 212d or 212e via the L3 network 206. WANs can connect geographically dispersed nodes over long-distance communications links, such as common carrier telephone lines, optical light paths, synchronous optical networks (SONET), or synchronous digital hierarchy (SDH) links. LANs and WANs can include L2 and/or L3 networks and endpoints.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective size of each network. The endpoints 208 can include any communication device or component, such as a computer, server, blade, hypervisor, virtual machine, container, process (e.g., running on a virtual machine), switch, router, gateway, host, device, external network, etc.

In some embodiments, the network environment 200 also includes a network controller running on the host 208a. The network controller is implemented using the Application Policy Infrastructure Controller (APIC™) from Cisco®. The APIC™ provides a centralized point of automation and management, policy programming, application deployment, and health monitoring for the fabric 202. In some embodiments, the APIC™ is operated as a replicated synchronized clustered controller. In other embodiments, other configurations or software-defined networking (SDN) platforms can be utilized for managing the fabric 202.

In some embodiments, a physical server 208 may have instantiated thereon a hypervisor 216 for creating and running one or more virtual switches (not shown) and one or more virtual machines 218, as shown for the host 208b. In other embodiments, physical servers may run a shared kernel for hosting containers. In yet other embodiments, the physical server 208 can run other software for supporting other virtual partitioning approaches. Networks in accordance with various embodiments may include any number of physical servers hosting any number of virtual machines, containers, or other virtual partitions. Hosts may also comprise blade/physical servers without virtual machines, containers, or other virtual partitions, such as the servers 208a, 208c, 208d, and 208e.

The network environment 200 can also integrate a network traffic monitoring system, such as the network traffic monitoring system 100 shown in FIG. 1. For example, the network traffic monitoring system of FIG. 2 includes sensors 220a, 220b, 220c, and 220d (collectively, "220"), collectors 222, and an analytics engine, such as the analytics engine 110 of FIG. 1, executing on the server 208e. The analytics engine 208e can receive and process network traffic data collected by the collectors 222 and detected by the sensors 220 placed on nodes located throughout the network environment 200. Although the analytics engine 208e is shown to be a standalone network appliance in FIG. 2, it will be appreciated that the analytics engine 208e can also be implemented as a virtual partition (e.g., VM or container) that can be distributed onto a host or cluster of hosts, software as a service (SaaS), or other suitable method of distribution. In some embodiments, the sensors 220 run on the leaf switches 212 (e.g., the sensor 220a), the hosts 208 (e.g., the sensor 220b), the hypervisor 216 (e.g., the sensor 220c), and the VMs 218 (e.g., the sensor 220d). In other embodiments, the sensors 220 can also run on the spine switches 210, virtual switches, service appliances (e.g., firewall, deep packet inspector, traffic monitor, load balancer, etc.) and in between network elements. In some embodiments, sensors 220 can be located at each (or nearly every) network component to capture granular packet statistics and data at each hop of data transmission. In other embodiments, the sensors 220 may not be installed in all components or portions of the network (e.g., shared hosting environment in which customers have exclusive control of some virtual machines).

As shown in FIG. 2, a host may include multiple sensors 220 running on the host (e.g., the host sensor 220b) and various components of the host (e.g., the hypervisor sensor 220c and the VM sensor 220d) so that all (or substantially all) packets traversing the network environment 200 may be monitored. For example, if one of the VMs 218 running on the host 208b receives a first packet from the WAN 206, the first packet may pass through the border leaf switch 212d, the spine switch 210b, the leaf switch 212b, the host 208b, the hypervisor 216, and the VM. Since all or nearly all of these components contain a respective sensor, the first packet will likely be identified and reported to one of the collectors 222. As another example, if a second packet is transmitted from one of the VMs 218 running on the host 208b to the host 208d, sensors installed along the data path, such as at the VM 218, the hypervisor 216, the host 208b, the leaf switch 212b, and the host 208d will likely result in capture of metadata from the second packet.

Figure 3:
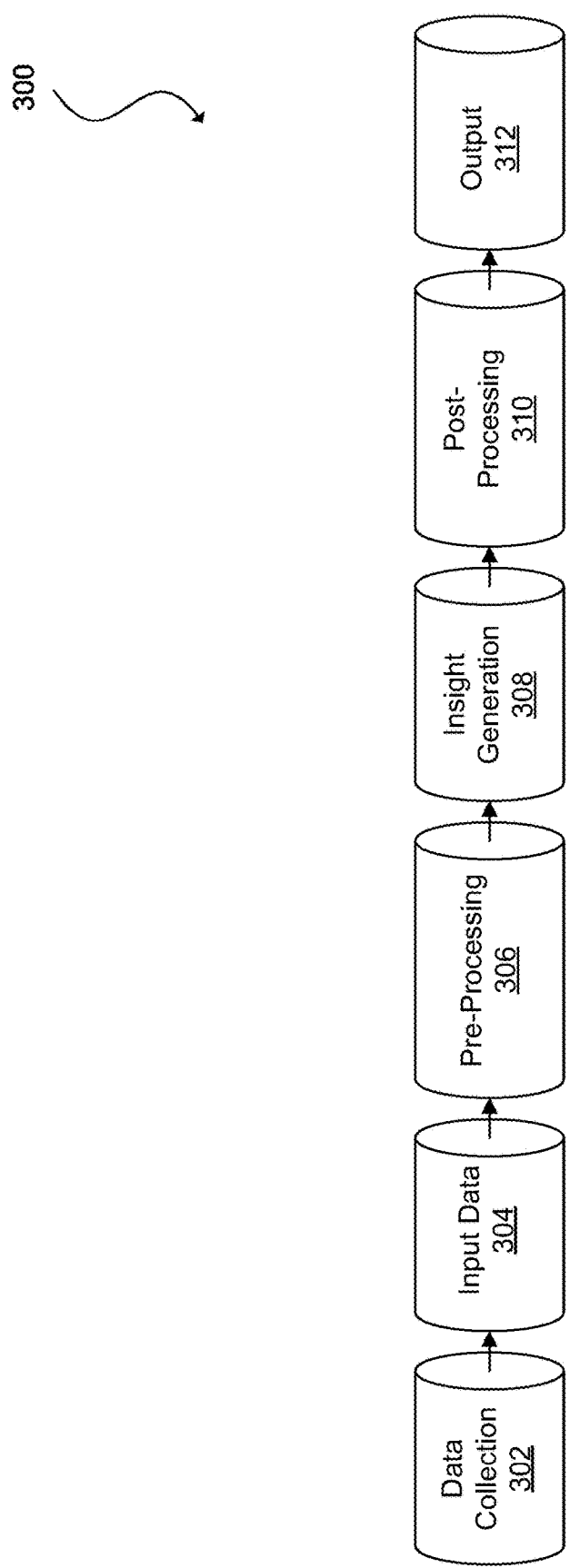
FIG. 3 illustrates an example of a data pipeline for generating network insights based on collected network information, according to one aspect of the present disclosure.

FIG. 3 illustrates an example of a data pipeline for generating network insights based on collected network information, according to one aspect of the present disclosure. The insights generated from data pipeline 300 may include, for example, discovered applications or inventories, application dependencies, policies, efficiencies, resource and bandwidth usage, network flows and status of devices and/or associated users having access to the network can be determined for the network using the network traffic data. In some embodiments, the data pipeline 300 can be directed by a network traffic monitoring system, such as the network traffic monitoring system 100 of FIG. 1; an analytics engine, such as the analytics engine 110 of FIG. 1; or other network service or network appliance. For example, an analytics engine 110 can be configured to discover applications running in the network, map the applications' interdependencies, generate a set of proposed network policies for implementation, and monitor policy conformance and non-conformance among other network-related tasks.

The data pipeline 300 includes a data collection stage 302 in which network traffic data and corresponding data (e.g., host data, process data, user data, etc.) are captured by sensors (e.g., the sensors 104 of FIG. 1) located throughout the network. The data may comprise, for example, raw flow data and raw process data. As discussed, the data can be captured from multiple perspectives to provide a comprehensive view of the network. The data collected may also include other types of information, such as tenant information, virtual partition information, out-of-band information, third party information, and other relevant information. In some embodiments, the flow data and associated data can be aggregated and summarized daily or according to another suitable increment of time, and flow vectors, process vectors, host vectors, and other feature vectors can be calculated during the data collection stage 302. This can substantially reduce processing.

The data pipeline 300 may also include an input data stage 304 in which a network or security administrator or other authorized user may configure insight generation by selecting the date range of the flow data and associated data to analyze, and those nodes for which the administrator wants to analyze. In some embodiments, the administrator can also input side information, such as server load balance, route tags, and previously identified clusters during the input data stage 304. In other embodiments, the side information can be automatically pulled or another network element can push the side information.

The next stage of the data pipeline 300 is pre-processing 306. During the pre-processing stage 306, nodes of the network are partitioned into selected node and dependency node subnets. Selected nodes are those nodes for which the user requests application dependency maps and cluster information. Dependency nodes are those nodes that are not explicitly selected by the users for an ADM run but are nodes that communicate with the selected nodes. To obtain the partitioning information, edges of an application dependency map (i.e., flow data) and unprocessed feature vectors can be analyzed.

Other tasks can also be performed during the pre-processing stage 306, including identifying dependencies of the selected nodes and the dependency nodes; replacing the dependency nodes with tags based on the dependency nodes' subnet names; extracting feature vectors for the selected nodes, such as by aggregating daily vectors across multiple days, calculating term frequency-inverse document frequency (tf-idf), and normalizing the vectors (e.g., $l_2$ normalization); and identifying existing clusters.

In some embodiments, the pre-processing stage 306 can include early feature fusion pre-processing. Early fusion is a fusion scheme in which features are combined into a single representation. Features may be derived from various domains (e.g., network, host, virtual partition, process, user, etc.), and a feature vector in an early fusion system may represent the concatenation of disparate feature types or domains.

Early fusion may be effective for features that are similar or have a similar structure (e.g., fields of TCP and UDP packets or flows). Such features may be characterized as being a same type or being within a same domain. Early fusion may be less effective for distant features or features of different types or domains (e.g., flow-based features versus process-based features). Thus, in some embodiments, only features in the network domain (i.e., network traffic-based features, such as packet header information, number of packets for a flow, number of bytes for a flow, and similar data) may be analyzed. In other embodiments, analysis may be limited to features in the process domain (i.e., process-based features, such as process name, parent process, process owner, etc.). In yet other embodiments, feature sets in other domains (e.g., the host domain, virtual partition domain, user domain, etc.) may be the.

After pre-processing, the data pipeline 300 may proceed to an insight generation stage 308. During the insight generation stage 308, the data collected and inputted into the data pipeline 300 may be used to generate various network insights. For example, an analytics engine 110 can be configured to discover of applications running in the network, map the applications' interdependencies, generate a set of proposed network policies for implementation, and monitor policy conformance and non-conformance among other network-related tasks. Various machine learning techniques can be implemented to analyze feature vectors within a single domain or across different domains to generate insights. Machine learning is an area of computer science in which the goal is to develop models using example observations (i.e., training data), that can be used to make predictions on new observations. The models or logic are not based on theory but are empirically based or data-driven.

After clusters are identified, the data pipeline 300 can include a post-processing stage 310. The post-processing stage 310 can include tasks such as filtering insight data, converting the insight data into a consumable format, or any other preparations needed to prepare the insight data for consumption by an end user. At the output stage 312, the generated insights may be provided to an end user. The end user may be, for example a network administrator, a third-party computing system, a computing system in the network, or any other entity configured to receive the insight data. In some cases, the insight data may be configured to be displayed on a screen or provided to a system for further processing, consumption, or storage.

With examples of network traffic monitoring systems, their operations and network environments in which they can be deployed described above, the disclosure now turns to FIGS. 4-7, which describe methods and examples for measuring effectiveness of segmentation policies implemented within an enterprise network such as network environment 200 of FIG. 2 using tools and functionalities of network monitoring system 100 of FIG. 1.

As noted above, the present disclosure is directed to providing an objective and standardized system and approach for measuring the effectiveness of a derived or enforced network segmentation policies. Segmentation effectiveness may be defined as a measure of effectiveness of a particular policy given the exposure of an application to hosts within the infrastructure of an enterprise network and/or external sources accessible via the enterprise network (e.g., an external internet host). Such measurement may be indicative of how well a given policy is satisfying the determined objective of preventing unauthorized traffic or hosts from accessing an application or a set of services/workloads executed in association with an application. This objective measurement improves efficiency in ensuring network security by allowing policies to be measured before implementation and adjusted if need be and/or to reliably adjust existing and currently implemented network segmentation policies in the network.

As will be described below, effectiveness score may be determined based on a number of variables such as source exposure risk, destination exposure risk and security posture, as defined above.

Figure 4:
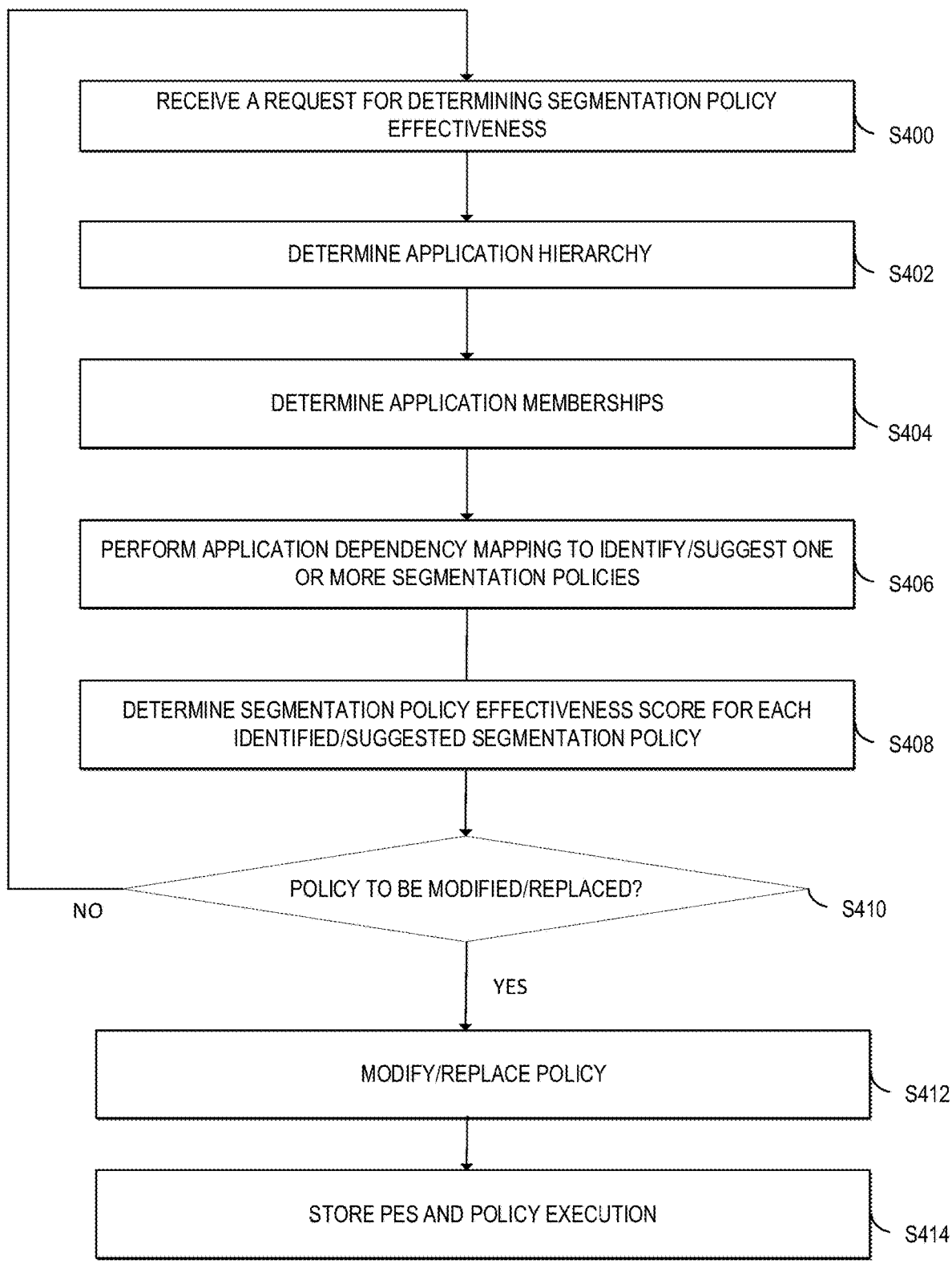
FIG. 4 describes a process of determining an effectiveness of a segmentation policy, according to one aspect of the present disclosure.

FIG. 4 describes a process of determining an effectiveness of a segmentation policy, according to one aspect of the present disclosure. FIG. 4 will be described from the perspective of analytics engine 150 of network monitoring system 100, executing computer-readable instructions corresponding to ADM module (service) 140. FIG. 4 will be described with reference to FIGS. 1-3.

In order to implement the process of FIG. 4, software agents such as sensors 104 are deployed to various nodes and workloads in network environment 200. For example such sensors may be deployed to bare metal or a virtual machine (examples of network nodes/hosts) and/or workloads such as Windows or Linux.

At S400, analytics engine 150 may receive a request via, for example, API 160 for determining segmentation policy effectiveness. Alternatively, analytics engine 150 may periodically perform such segmentation policy effectiveness analysis, with periodicity being a configurable parameter determined based on experiments and/or empirical studies (e.g., once every minute, once every few hours, once every day, once every week, once every month, once every year, etc.).

At S402, analytics engine 150 determines an application hierarchy using telemetry data collected by sensors 104. Such collected telemetry data may then be annotated to provide contextual information for the collected flows and telemetry data and may include information such as individual IP addresses or subnets in a time series data base along with associated department within an organization (e.g., human resources, IT department, etc.) as well as one or more datacenters in which a particular workload is being executed.

An example of network monitoring system 100 may be Tetration platform developed by Cisco Inc., of San Jose, Calif. In the non-limiting example of Tetration platform, a process by which such application hierarchy may be determined is referred to as Scopes. Scopes may be used to identify application memberships, which is then used in turn within application segmentation to control application visibility and granularity. Scope membership may identify information such as role based access for each application as well as identifying of children or parent applications, etc.

At S404, analytics engine 150 may determine/define application memberships to identify all workloads that make up an application using, for example, Scopes process of Tetration described above.

At S406, analytics engine 150 may execute ADM logic 140 to implement application dependency mapping (segmentation) that provides insight into applications running in a datacenter or in a multi-datacenter environment or enterprise network. Application dependency mapping may identify information including, but not limited to, services, providers and consumers as well as rules defined by services. Workloads associated with each provider and consumer may also be determined through application dependency mapping. At S406 and by implementing application dependency mapping, policies (segmentation policies) for all application dependencies may be identified (if already implemented or enforced) or suggested (for implementation and enforcement).

At S408, analytics engine 150 determines a Segmentation Policy Effectiveness score or simply Policy Effectiveness Score (PES) for each policy identified or suggested at S406 through application dependency mapping. The process of determining PES for each policy will be described in detail with respect to FIG. 5. A PES may be accompanied with further information such as a corresponding application's details through the application's segmentation journey as the application moves from a non-segmented state in incremental steps towards a zero trust state in the network environment 200.

At S410, all PESs (for all identified/suggested policies) are evaluated to determine if a particular policy should be modified, replaced or maintained (enforced using current version). Results of PESs may be presented on a GUI in a tabular form as will be described below with reference to FIG. 7.

Determination on modification/replacement or maintaining (execution) of policies may be made in a variety of different ways. For example, PES scores and associated details may be presented on a GUI for manual review by a network operator and a determination of whether it should be modified, replaced or maintained. In another example, a machine-learning algorithm or model may be deployed that may, over time, be trained to identify correlations between how a policy may be modified, replaced or maintained given a particular PES score. Example considerations for modifying, replacing and/or maintaining a given policy include, but are not limited to, application behavior given a particular policy, consumer/provider cluster sizes, number of workloads, etc.

If at S410, analytics engine 150 determines that a particular policy is to be adjusted or modified, then at S412 the policy is adjusted/modified (executed) according to any known or to be developed approach or methodology in the industry. Otherwise, the process reverts back to S404 and S404, S406, S408, S410 and S412 may be repeated.

At S414, information associated with determining PES and corresponding modification/replacement/maintenance (execution) of policies may be stored in database of network monitoring system 100 for future reference and/or training of analytics engine 150 for further autonomous PES determination and modification, replacement and maintaining of network policies as described above.

Figure 5:
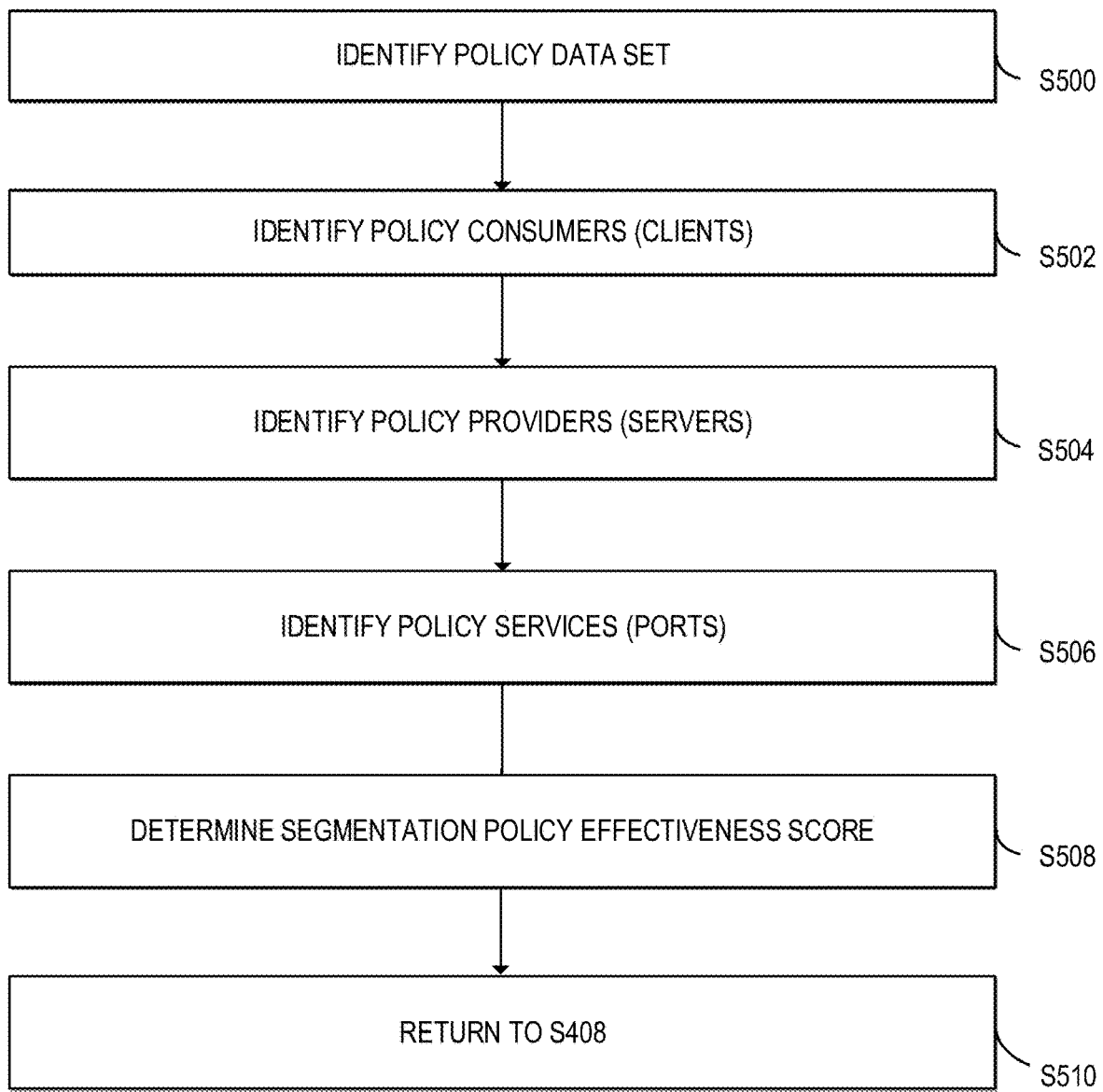
FIG. 5 describes a process for determining policy effectiveness score of FIG. 4, according to one aspect of the present disclosure.

FIG. 5 describes a process for determining policy effectiveness score of FIG. 4, according to one aspect of the present disclosure. FIG. 5 will be described from the perspective of analytics engine 150 of network monitoring system 100, executing computer-readable instructions corresponding to ADM module (service) 140. FIG. 4 will be described with reference to FIGS. 1-4.

In describing FIG. 5, an assumption is made that a policy is identified/suggested by analytics engine 150 at S406.

At S500, analytics engine 150 identifies a data set for a given identified/suggested policy (policy data set) from, for example, a policy recommendation engine such as policy engine 138 of FIG. 1. Examples of a policy recommendation engine include, but are not limited to, policy recommendation engine of Tetration platform developed by Cisco, Inc. of San Jose, Calif., Illumio, Guardicore, etc.

At S502, analytics engine 150 identifies policy consumers (clients) for the given policy. A policy consumer may be defined as an initiator/originator of network traffic. For example, a user browsing to a web page would be a non-limiting example of a policy consumer.

At S504, analytics engine 150 identifies a total number of providers (servers) for the given policy. A provider may be defined as a destination providing a network service. For example, when a user browses to a web page, the host providing web services for the webpage would be a non-limiting example of a provider.

At S506, analytics engine 150 identifies policy services (provider ports) that form/constitute the given policy. Services may be associated with ports and protocols required to access a given application. In a non-limiting example of a user accessing a web site, policy services would typically be TCP PORTs 80 and 443.

FIG. 6, illustrates an example policy and associated policy consumers, providers and services. FIG. 6 will be further described below.

At S508, analytics engine 150 determines a segmentation policy effectiveness score (PES) for the given policy based on the identified policy consumers, providers and services. In one example, PES may be determined according to the following formula:

$$PES = 1 - \text{source-risk}/\text{potential source-risk} \quad (1)$$

In formula (1), source-risk is the total number of consumers, providers and policy services identified per S502, S504 and S506. Potential source-risk is a total number of consumers, providers and policy services that can potentially access an application if there is no security or segmentation policy (total number of consumers, providers and policy services known to the monitoring system of FIG. 1).

Per formula (1), PES score may range from 0 to 1. A Score of 1 may be indicative of a completely effective segmentation policy while a score of 0 may be indicative of a completely ineffective segmentation policy. Scale of PESs may not be limited to 0 to 1 and may be any other range (e.g., 0-10, 0-20, 0-100, etc.).

At S510, the process returns to S408 of FIG. 4 and the process of FIG. 4 is continued as described above.

By implementing the process of FIGS. 4-7, an objective measurement of effectiveness of network segmentation policies may be achieved, which advantageously allows for such policies to be measured before implementation and adjusted if need be and/or to reliably adjust existing and currently implemented network segmentation policies in the network.

With a process of determining an effectiveness of a segmentation policy, described with reference to FIGS. 4 and 5, FIG. 6 is described next, which is an example segmentation policy, mentioned above.

FIG. 6 is an example network segmentation policy, according to an aspect of the present disclosure. As can be seen from example policy 600 of FIG. 6, analytics engine 150 is able to identify services provided (e.g., port 443), number of policy consumers (e.g., 2.0) and number of policy providers (17.0), which is then used per formula 1 to determine PES.

FIG. 7 illustrates a result of determining policy effectiveness score in a tabular form, according to one aspect of the present disclosure. Table 700 is a non-limiting example where effectiveness of a policy is shown for 3 applications 702. For each application from applications 702, associated potential source risk 704, source risk 706 and consumers 708 are identified. Finally, using formula (1) a corresponding PES 710 is calculated when the policy is applied to each of the applications 702.

With examples of PES determination described with reference to FIGS. 4-7, the disclosure now turns to FIG. 8, which illustrates an example computing system, according to one aspect of the present disclosure. Such example computing system can be used to implement analytics engine 150 and/or any other component of network monitoring system 100 of FIG. 1 and/or network environment 200 of FIG. 2.

Figure 8:
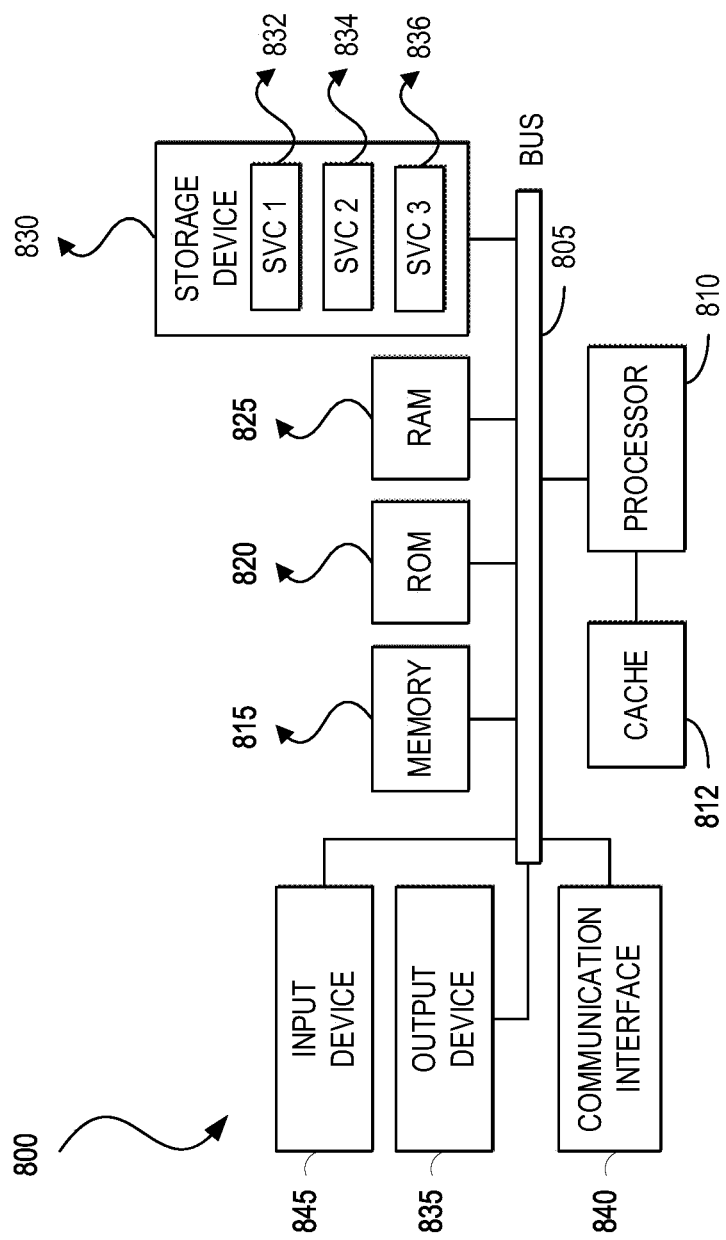
FIG. 8 illustrates an example computing system, according to one aspect of the present disclosure.

FIG. 8 shows an example of computing system 800, which can be for example any computing device making up authentication service 415 or any component thereof in which the components of the system are in communication with each other using connection 805. Connection 805 can be a physical connection via a bus, or a direct connection into processor 810, such as in a chipset architecture. Connection 805 can also be a virtual connection, networked connection, or logical connection.

In some embodiments computing system 800 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example computing system 800 includes at least one processing unit (CPU or processor) 810 and connection 805 that couples various system components including system memory 815, such as read only memory (ROM) 820 and random access memory (RAM) 825 to processor 810. Computing system 800 can include a cache of high-speed memory 812 connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. There is no restriction on operating on any particular hardware arrangement and therefore the basic features here may easily be substituted for improved hardware or firmware arrangements as they are developed.

Storage device 830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

For clarity of explanation, in some instances the various embodiments may be presented as including individual functional blocks including functional blocks comprising devices, device components, steps or routines in a method embodied in software, or combinations of hardware and software.

Claim language reciting "at least one of" refers to at least one of a set and indicates that one member of the set or multiple members of the set satisfy the claim. For example, claim language reciting "at least one of A and B" means A, B, or A and B.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware, and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
identifying one or more applications within an enterprise network;
identifying at least one network security policy in association with the one or more applications within the enterprise network;
determining a score of the network security policy based on information corresponding to exposure of each of the one or more applications within the enterprise network, the score representing how well the network security policy is preventing unauthorized traffic or hosts from accessing the one or more applications or a set of services/workloads executed in association with the one or more applications, exposure of each of the one or more applications being based on:

a source exposure risk indicative of a total number of hosts and workloads accessing a particular application;

a destination exposure risk indicative of a total number of hosts and workloads providing services for the particular application;

a security posture based on overall consumers and providers for the particular application; and executing the network security policy based on the score.

2. The method of claim 1, further comprising:

receiving a request for determining network security policy scores.

3. The method of claim 1, wherein identifying the one or more applications comprises:

determining an application hierarchy and membership for each of the one or more applications in the enterprise network.

4. The method of claim 1, wherein identifying the network security policy comprises:

performing an application dependency mapping for the one or more applications.

5. The method of claim 1, wherein determining the score for the network security policy comprises:

identifying the information corresponding to the exposure of the one or more applications.

6. The method of claim 5, wherein the information includes providers, consumers and services associated with each of the one or more applications.

7. The method of claim 1, wherein executing the network security policy includes one of modifying, replacing or maintaining a current version of the network security policy.

8. A device comprising:

one or more processors; and a non-transitory computer-readable storage medium comprising instructions stored thereon which, when executed by the one or more processors, cause the one or more processors to:

identify one or more applications within an enterprise network;

identify at least one network security policy in association with the one or more applications within the enterprise network;

determine a score of the network security policy based on information corresponding to exposure of each of the one or more applications within the enterprise network, the score representing how well the network security policy is preventing unauthorized traffic or hosts from accessing the one or more applications or a set of services/workloads executed in association with the one or more applications, exposure of each of the one or more applications being based on:

a source exposure risk indicative of a total number of hosts and workloads accessing a particular application;

a destination exposure risk indicative of a total number of hosts and workloads providing services for the particular application;

a security posture based on overall consumers and providers for the particular application; and execute the network security policy based on the score.

9. The device of claim 8, wherein the one or more processors are configured to execute the computer-readable instructions to receive a request for determining network security policy scores.

10. The device of claim 8, wherein the one or more processors are configured to execute the computer-readable instructions to determine an application hierarchy and membership for each of the one or more applications in the enterprise network.

11. The device of claim 8, wherein the one or more processors are configured to execute the computer-readable instructions to determine the score for the network security policy by performing an application dependency mapping for the one or more applications.

12. The device of claim 8, wherein the one or more processors are configured to execute the computer-readable instructions to identify the information corresponding to the exposure of the one or more applications for determining the score.

13. The device of claim 12, wherein the information includes providers, consumers and services associated with each of the one or more applications.

14. The device of claim 8, wherein the one or more processors are configured to execute the computer-readable instructions to execute the network security policy by one of modifying, replacing or maintaining a current version of the network security policy.

15. A non-transitory computer-readable storage medium comprising computer-readable instructions stored thereon which, when executed by one or more processors, cause the one or more processors to:

identify one or more applications within an enterprise network;

identify at least one network security policy in association with the one or more applications within the enterprise network;

determine a score of the network security policy based on information corresponding to exposure of each of the one or more applications within the enterprise network, the score representing how well the network security policy is preventing unauthorized traffic or hosts from accessing the one or more applications or a set of services/workloads executed in association with the one or more applications, exposure of each of the one or more applications being based on:

a source exposure risk indicative of a total number of hosts and workloads accessing a particular application;

a destination exposure risk indicative of a total number of hosts and workloads providing services for the particular application;

a security posture based on overall consumers and providers for the particular application; and execute the network security policy based on the score.

16. The non-transitory computer-readable storage medium of claim 15, wherein the execution of the computer-readable instructions cause the one or more processors to receive a request for determining network security policy scores.

17. The non-transitory computer-readable storage medium of claim 15, wherein the execution of the computer-readable instructions cause the one or more processors to determine an application hierarchy and membership for each of the one or more applications in the enterprise network.

18. The non-transitory computer-readable storage medium of claim 15, wherein the execution of the computer-readable instructions cause the one or more processors to determine the score for the network security policy by performing an application dependency mapping for the one or more applications.

19. The non-transitory computer-readable storage medium of claim 15, wherein the execution of the computer-readable instructions cause the one or more processors to identify the information corresponding to the exposure of the one or more applications for determining the score, the information including providers, consumers and services associated with each of the one or more applications.

20. The non-transitory computer-readable storage medium of claim 15, wherein the execution of the computer-readable instructions cause the one or more processors to execute the network security policy by one of modifying, replacing or maintaining a current version of the network security policy.

* * * * *